Patented Oct. 12, 1943

2,331,334

UNITED STATES PATENT OFFICE 2,331,334

PREPARATION OF THYREOTROPIC HORMONE AND PROCESS FOR PRODUCING THE SAME

Hans Maier-Hüser and Karl Junkmann, Berlin, Germany, assignors to Schering Corporation, Bloomfield, N. J., a corporation of New Jersey No Drawing. Application January 10, 1939, Serial No. 250,160. In Germany January 15, 1938

19 Claims. (Cl. 167—74)

This invention relates to highly active preparations of thyreotropic hormone from anterior lobes of the hypophysis and a process for the production of the same.

The production of thyreotropic hormone preparations from the hypophysis has already been described several times, as for example in British patents, Nos. 396,581 and 428,419.

According to the present invention it is now possible to obtain particularly high active preparations of thyreotropic hormone in good yields which are quite free from the gonadotropic hormone. The process of manufacture of the invention consists in that aqueous extracts from anterior lobes of the hypophysis or other preparations containing this hormone, which are produced in known manner at weak acid or alkaline reaction at a temperature of 17–20° C., are subjected to a precipitation with zinc or cadmium salts suitably at a pH above 4. The precipitate obtained can be purified in customary manner, for example by dissolving in excess of a suitable acid such as acetic acid, sulphuric acid, hydrochloric acid or the like, dialysis or ultra-filtration of the solution obtained and precipitation of the undialysed or filtered portions of the liquid with an organic solvent miscible with water. Suitably however in order to obtain a particularly active precipitate, a new purification process is employed which is also applicable for the preparations obtained according to other processes such as those of the above specifications. This latter purification process consists in that from the solution of the precipitate, obtained according to one of the known or above mentioned processes such as that described in U. S. Patent No. 2,073,354, in a suitable acid, as for instance, in acetic, sulfuric, hydrochloric acid and the like, the accompanying substances are removed in the presence of mineral acid at a pH below 2 by precipitation by means of strongly acid albumen precipitating agents and if desired any hormone precipitated at the same time brought into solution from the precipitate by several reprecipitations thereof under the same conditions. As such strongly acid albumen precipitating agents are primarily employed trichloracetic acid and sulpho-salicyclic acid, which with a strongly acid reaction of the solution to be precipitated either do not precipitate the thyreotropic hormone or allow any precipitated hormone to pass into solution. The necessary reaction conditions, acid content of the solution, quantity of the precipitating agent and so on can easily be ascertained by preliminary experiment. In general on treatment of the solution treated with mineral acids at a pH below 2 essentially only a precipitation of the accompanying substances but not of the thyreotropic hormone takes place.

From the combined filtrates from which the excess of the precipitating agent employed need not be removed, the hormone is then precipitated by treatment with albumen precipitating agents of the character of the nitro-phenols, for example with picric acid, picrolonic acid and the like or with complex acids of metals of the seventh group of the periodic system, for example with tungstic acid, molybdic acid, phospho-tungstic acid, phosphomolybdic and so on or equivalent compounds. Also in the case of these precipitating agents the optimum precipitating conditions can be ascertained by prior experiments. After splitting up the precipitate in known manner into its components, for example, by treating it with an organic solvent, the aqueous solution containing the hormone is suitably subjected to a dialysis or ultra-filtration for removal of inactive salts; and by precipitation, suitably in admixture with ether or another suitable water-insoluble solvent, with an organic solvent miscible with water, for example acetone or methyl alcohol, the thyreotropic hormone preparation is obtained in good yield in a degree of purity of 50–80 Gp. U. per mg. Preparations of still higher degree of purity (up to 160 Gp. U. per mg.) can be obtained by repetition of the operations (treatment with sulpho-salicylic acid and trichloracetic acid, precipitation with picric acid), if the individual stages of this repetition are carried out as rapidly as possible and in the cold and suitably a further ultra-filtration of the picrate solution included prior to the final precipitation.

The following examples illustrate the invention:

Example 1

200 ccs. of acetic acid extract of the hypophyses of pigs, which contains altogether 1500–1600 thyreotropic guinea pig units (Gp. U.) (1 mg. of dry residue of this extract corresponds to 0.6 Gp. U.), are adjusted to pH 7.9 with 6 ccs. of 5% caustic soda solution. After addition of 180 ccs. of aqueous 1% zinc acetate solution there is produced an abundant easily depositing precipitate at a pH of 7.1 which after 12 hours standing in an ice chest is centrifuged. The precipitate dissolved in dilute acetic acid contains after 12 hours dialysis in regenerated cellulose ("Cellophane 300" Regd. T. M.) at least 1500 Gp. U. 1 mg. of the dry residue from this solution corresponds to 14 Gp. U.

In a corresponding manner there is also obtained by addition of for example cadmium sulphate a highly valuable hormone.

If the filtrate from the zinc or cadmium precipitate is treated with alkali, suitably with ammonia, also the unprecipitated residue of thyreotropic activity can be quantitatively precipitated. Since its purity is less than that of the first precipitated portion it is dissolved in acetic acid and added to a second acetic acid extract prior to the zinc or cadmium precipitation.

*Example 2*

Into 10 litres of a crude extract produced by extraction of 500 grams of ox hypophysis dispersion with 0.25% acetic acid, which contains altogether 50,000–60,000 Gp. U. (1.2 Gp. U. in 1 mg. of dry residue of this extract), are introduced 100 grams of powdered zinc acetate and the whole adjusted to pH 7.5 with 150 ccs. of 10% ammonia. From the very easily settling precipitate the clear almost colourless solution is decanted after 12 hours and the residue freed from liquid to a far-reaching extent by centrifuging. The zinc precipitate is now suspended in 1 litre of water, acidified with stirring and ice cooling with 30% acetic acid and adjusted with 10% sulphuric acid to pH 2. Thereupon slowly 150 ccs. of 20% sulpho-salicylic acid are introduced until a test filtrate no longer exhibits precipitation with sulpho-salicylic acid. The voluminous precipitate produced is after stirring for 1 hour well centrifuged, for reprecipitation suspended in 200 ccs. of water, brought into solution with dilute ammonia and after adjusting to pH 2 with dilute sulphuric acid precipitated with 60 ccs. of sulpho-salicyclic acid (20%). The precipitate is separated in the same manner as stated above and in order to obtain the last residues of active substance again precipitated. The combined sulpho-salicylic acid filtrates are thereupon with ice cooling stirred with finely powdered picric acid until solution no longer takes place; then further an excess of 200 ccs. of saturated aqueous picric acid are introduced. The easily settling precipitate is filtered with suction after 12 hours, washed with saturated picric acid solution, suspended in 250 ccs. of water and brought into solution with dilute ammonia. At weak alkaline reaction there are now introduced 2500 ccs. of a mixture of equal parts of methyl alcohol and ether with shaking, the precipitate filtered with suction after 1 hour, thoroughly washed with solvent mixture and finally with ether. After drying in vacuum 1.2 grams are obtained of a white substance of 40 Gp. U. per mg.

*Example 3*

1.1 grams of a final product obtained according to Example 1 or by other methods, which contains 40 Gp. U. per mg. are suspended in 100 ccs. of water, adjusted with ice cooling with 10% hydrochloric acid to pH 2.0 and 70 ccs. of a 20% aqueous trichloracetic acid solution introduced. After 30 minutes the abundant precipitate is well centrifuged, and the precipitation repeated two to three times with the precipitate dissolved in dilute ammonia after adjustment with 10% hydrochloric acid to pH 2.0. The combined trichloracetic acid filtrates are treated in the cold with the same volume of concentrated aqueous picric acid, kept in a cool place and after 1 hour centrifuged. The picric acid precipitate is suspended in a little water, brought into solution with 10% ammonia, at weak alkaline reaction precipitated with 10 times the volume of methyl alcohol and finally after washing with absolute ether dried in vacuum. There are obtained after this operation 560 mg. of pure white substance easily soluble in water which contains 70 thyreotropic Gp. U. per mg. The preparation even in high doses is free from gonadotropic hormone.

*Example 4*

1.7 grams of an end product obtained according to Example 2 but by means of trichloracetic acid instead of sulpho-salicylic acid and 10% hydrochloric acid instead of sulphuric acid, which end product contains 30 Gp. U. per mg., are subjected to the following purification process, the individual stages of which are carried out with continuous ice cooling and as rapidly as possible. The preparation is suspended in 50 ccs. of water, adjusted with 10% hydrochloric acid to pH 2.0 and 40 ccs. of 20% trichloracetic acid introduced. After 30 minutes the abundant precipitate is centrifuged, the precipitate suspended in 60 ccs. of water, dissolved in dilute ammonia, again adjusted with 10% hydrochloric acid to pH 2.0 and precipitated with 30 ccs. of 20% trichloracetic acid. The centrifuged residue is again reprecipitated in the same manner. The combined trichloracetic acid solutions are treated with the same volume of concentrated aqueous picric acid with ice cooling and the precipitate filtered with suction after 1 hour. The residue is dissolved with ammonia and filtered through an ultrafine filter which does not allow congo-red to pass through. The residue remaining on the ultrafine filter is now taken up in 10 ccs. of water and precipitated with 100 ccs. of methyl alcohol. The easily settling precipitate is filtered with suction after a short time, washed with methyl alcohol and ether and dried in vacuum. There are thus obtained 172 mg. of a pure white compact preparation which contains per mg. at least 150 Gp. U.

*Example 5*

2 grams (1 mg.=2.3 Gp. U.; 2 grams=4600 Gp. U.) of a crude product obtained according to the process of U. S. Patent No. 2,073,354 by precipitation with picric acid and subsequent decomposition with acetone, are dissolved in 100 ccs. of water, adjusted with 10% hydrochloric acid to pH 1.0 and precipitated with ice cooling with 50 ccs. of 20% sulpho-salicylic acid. After a short time the precipitate is centrifuged and washed with 30 ccs. of a 7% sulpho-salicylic acid solution containing hydrochloric acid and having a pH 1.0. The combined sulpho-salicylic acid filtrates are thereupon neutralised with ammonia and dialysed until the reaction with ferric chloride for sulpho-salicylic acid is negative. The remaining liquid is precipitated with 10 times the quantity of acetone, after good settling the flocculent precipitate filtered with suction and the precipitate washed several times with acetone and ether. The preparation dried in vacuum has a weight of 400 mg. and contains more than 10 Gp. U. per mg. Of course, many other changes and variations in the reaction conditions, etc., may be made by those skilled in the art in accordance with the principles set forth herein and in the claims annexed hereto.

What we claim is:

1. In a process for the isolation of the thyreotropic hormone from solutions thereof containing organic impurities including albuminous materials, the steps comprising adjusting the pH value of the solution to a value no higher than about 2, adding an albumen precipitating agent of the strongly acid type to cause precipitation of the non-thyreotropic substances while the thyreotropic hormone remains in solution, separating the solution from the albuminous precipitate, and recovering the thyreotropic hormone from the solution.

2. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating said thyreotropic precipitate from the liquor containing the gonadotropic substances, dissolving the precipitate in an aqueous medium, treating the thyreotropic solution with an albumen precipitating agent of the strongly acid type, the mixture being at a pH value no higher than about 2, whereby non-thyreotropic material is precipitated while the thyreotropic hormone remains in solution, and separating the dissolved thyreotropic hormone from the insolubles.

3. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating said precipitate from the liquor containing the gonadotropic substances, at least partially dissolving said precipitate in a medium sufficiently acidic to maintain the thyreotropic hormone in solution in the presence of an albumen precipitating agent of the strongly acid type, treating the obtained solution with an albumen precipitating agent of the strongly acid type, removing the deposit of insolubles from the solution, and treating said solution with an agent for precipitating the thyreotropic hormone principle.

4. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating the thyreotropic precipitate from the liquor containing the gonadotropic substances, dissolving the thyreotropic material in an aqueous medium with an albumen precipitating agent of the strongly acid type under sufficiently strong acid conditions to maintain the thyreotropic hormone in solution despite the presence of the precipitating agent, removing the resulting solution of thyreotropic hormone from the insolubles, treating said solution with an agent for precipitating the thyreotropic hormone principle, and separating the thyreotropic hormone principle from the precipitant.

5. In a process for the isolation of the thyreotropic hormone from solutions thereof containing impurities including gonadotropic substances and albumens, the steps comprising treating the solution with a salt of a metal selected from the group consisting of zinc and cadmium, separating the precipitate containing the thyreotropic hormone from the liquor containing albuminous impurities, dissolving the precipitate in water, treating the thyreotropic solution with an albumen precipitating agent of the strongly acid type, the mixture being at a pH value no higher than about 2, whereby non-thyreotropic material is precipitated while the thyreotropic hormone remains in solution, removing the solution of thyreotropic hormone from the insolubles, and treating the solution with an agent for precipitating the thyreotropic hormone principle.

6. In a process for the isolation of the thyreotropic hormone from solutions thereof containing impurities including gonadotropic substances and albumens, the steps comprising treating the solution with a salt of a metal selected from the group consisting of zinc and cadmium to form a precipitate containing the thyreotropic hormone, separating said precipitate from the liquor containing the gonadotropic substances, dissolving the thyreotropic material and treating the same with an albumen precipitating agent of the strongly acid type under sufficiently strong acid conditions to maintain the thyreotropic hormone in solution while non-thyreotropic material is precipitated, removing the deposit of insolubles from the solution, and treating said solution with an agent for precipitating the thyreotropic hormone principle.

7. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating said precipitate from the liquor containing the gonadotropic substances, dissolving the thyreotropic material and treating the same with an albumen precipitating agent of the strongly acid type under sufficiently strong acid conditions to maintain the thyreotropic hormone in solution while non-thyreotropic material is precipitated, removing the deposit of insolubles from the solution, adding to the solution a member of the group consisting of picrolonic acid and nitrophenols capable of precipitating albumens, dissolving the precipitate in an aqueous medium, and treating the solution with a water-miscible organic liquid capable of precipitating the thyreotropic hormone principle.

8. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating the thyreotropic precipitate from the liquor containing the gonadotropic substances, dissolving the thyreotropic material and treating the same with an albumen precipitating agent of the strongly acid type, the mixture being at a pH no higher than about 2 whereby non-thyreotropic material is precipitated while the thyreotropic hormone remains in solution, removing the solution of thyreotropic hormone from the insolubles, treating said solution with a member of the group consisting of picrolinic acid and nitrophenols capable of precipitating albumens to precipitate the thyreotropic hormone principle, dissolving the precipitate in an aqueous medium, and adding to the solution a water-miscible organic liquid capable of precipitating the hormone.

9. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating the thyreotropic precipitate from the liquor containing the gonadotropic substances, dissolving the thyreotropic material and treating the same with an albumen precipitating agent of the strongly acid type at a pH no higher than about 2 whereby non-thyreotropic material is precipitated while the thyreotropic hormone remains in solution, removing the solution of thyreotropic hormone from the insolubles, treating said solution with an albumen precipitating acid compound of a metal of the seventh group of the periodic system to precipitate the hormone principle, dissolving the precipitate in an aqueous medium, and adding to the solution a water-miscible organic liquid capable of precipitating the hormone.

10. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating the thyreotropic precipitate from the liquor containing the gonadotropic substances, dissolving the thyreotropic material and treating the same with an albumen precipitating agent of the strongly acid type, the mixture being at a pH no higher than about 2 whereby non-thyreotropic material is precipitated while the thyreotropic hormone remains in solution, removing the solution of thyreotropic hormone from the insolubles, dialyzing said solution, and treating the non-dialyzed portion with an agent for precipitating the thyreotropic hormone principle.

11. In a process for the isolation of the thyreotropic hormone from solutions thereof containing impurities including gonadotropic substances and albumens, the steps comprising treating the solution with a salt of a metal selected from the group consisting of zinc and cadmium to form a precipitate containing the thyreotropic hormone, separating the thyreotropic precipitate from the liquor containing the gonadotropic substances, dissolving the thyreotropic material and treating the same with an albumen precipitating agent of the strongly acid type, the mixture being at a pH no higher than about 2 whereby non-thyreotropic material is precipitated while the thyreotropic hormone remains in solution, removing the solution of thyreotropic hormone from the insolubles, dialyzing the resulting solution, and treating the residual solution with an agent for precipitating the thyreotropic hormone principle.

12. In a process for the isolation of the thyreotropic hormone from solutions thereof containing impurities including gonadotropic substances and albumens, the steps comprising treating the solution with an albumen precipitating agent to form a precipitate containing the thyreotropic hormone, removing said precipitate from the liquor containing the gonadotropic substances, dissolving said precipitate in a mineral acid solution having a pH value no higher than about 2, treating the resulting solution with an albumen precipitating agent of the strongly acid type, whereby non-thyreotropic material is precipitated while the thyreotropic hormone remains in solution, removing the solution of thyreotropic hormone from the insolubles, treating said solution with picric acid to precipitate the thyreotropic hormone principle, and separating the thyreotropic hormone principle from the picric acid precipitant.

13. In a process for the isolation of the thyreotropic hormone from solutions thereof containing impurities including gonadotropic substances and albumens, the steps comprising treating the solution with an albumen precipitating agent to form a precipitate containing the thyreotropic hormone, separating said precipitate from the liquor containing the gonadotropic substances, dissolving said precipitate in a mineral acid solution at a pH no higher than about 2, treating the resulting solution with an albumen precipitating agent of the strongly acid type, whereby non-thyreotropic material is precipitated while the thyreotropic hormone remains in solution, removing the solution of thyreotropic hormone from the insolubles, treating said solution with picric acid to precipitate the thyreotropic hormone, separating and dissolving the precipitate of picric acid-thyreotropic hormone principle in a dilute ammonia solution, passing the obtained ammoniacal solution through an ultrafine filter, dissolving the residue in water, and treating the solution with a water-miscible organic solvent to precipitate the thyreotropic hormone principle.

14. In a process for the production of highly active preparations of thyreotropic hormone, the steps which comprise treating an aqueous extract which contains the thyreotropic hormone with a solution of a member of the group consisting of zinc and cadmium salts, maintained at a pH value above 4, and separating the resulting precipitate containing the thyreotropic hormone from the liquid.

15. A thyreotropic hormone preparation obtained by precipitation of the thyreotropic hormone and accompanying albuminous substances from an extract of the anterior lobe of the hypophyses, followed by solution of the precipitate in an aqueous medium at a pH value no higher than about 2, treatment with an albumen-precipitating agent to cause separation of non-thyreotropic substances, addition of a precipitating agent to the solution to effect precipitation of the thyreotropic hormone, solution of the hormone in an aqueous alkaline medium, and reprecipitation of the hormone by addition of a water-miscible organic solvent in which the hormone is insoluble, said preparation being a white substance soluble in water, in dilute ammonia solution, insoluble in methyl alcohol, and completely soluble in trichloracetic acid at a pH below 2, and being substantially free from gonadotropic hormones.

16. In a process for the isolation of the thyreotropic hormone from solutions thereof containing impurities including gonadotropic substances and albumens, the steps comprising treating an extract of hypophyses with an aqueous solution of a salt of a metal of the group consisting of zinc and cadmium at a pH above 4 to form a precipitate containing the thyreotropic hormone, separating said thyreotropic precipitate, dissolving the same in dilute acid, and dialyzing the solution to remove the metal salt.

17. In a process for the isolation of the thyreotropic hormone from impure solutions thereof, the steps comprising treating the solution with a salt of a metal selected from the group consisting of zinc and cadmium at a pH above 4, removing the resulting precipitate, dissolving the same in excess acid, separating the metal salt by dialysis, and adding to the thyreotropic solution an organic water-miscible liquid in which the hormone is not soluble to precipitate the thyreotropic hormone principle.

18. Process according to claim 1 wherein the albumen precipitating agent is trichloracetic acid.

19. Process according to claim 1 wherein the albumen precipitating agent is sulpho-salicyclic acid.

HANS MAIER-HÜSER.
KARL JUNKMANN.